…

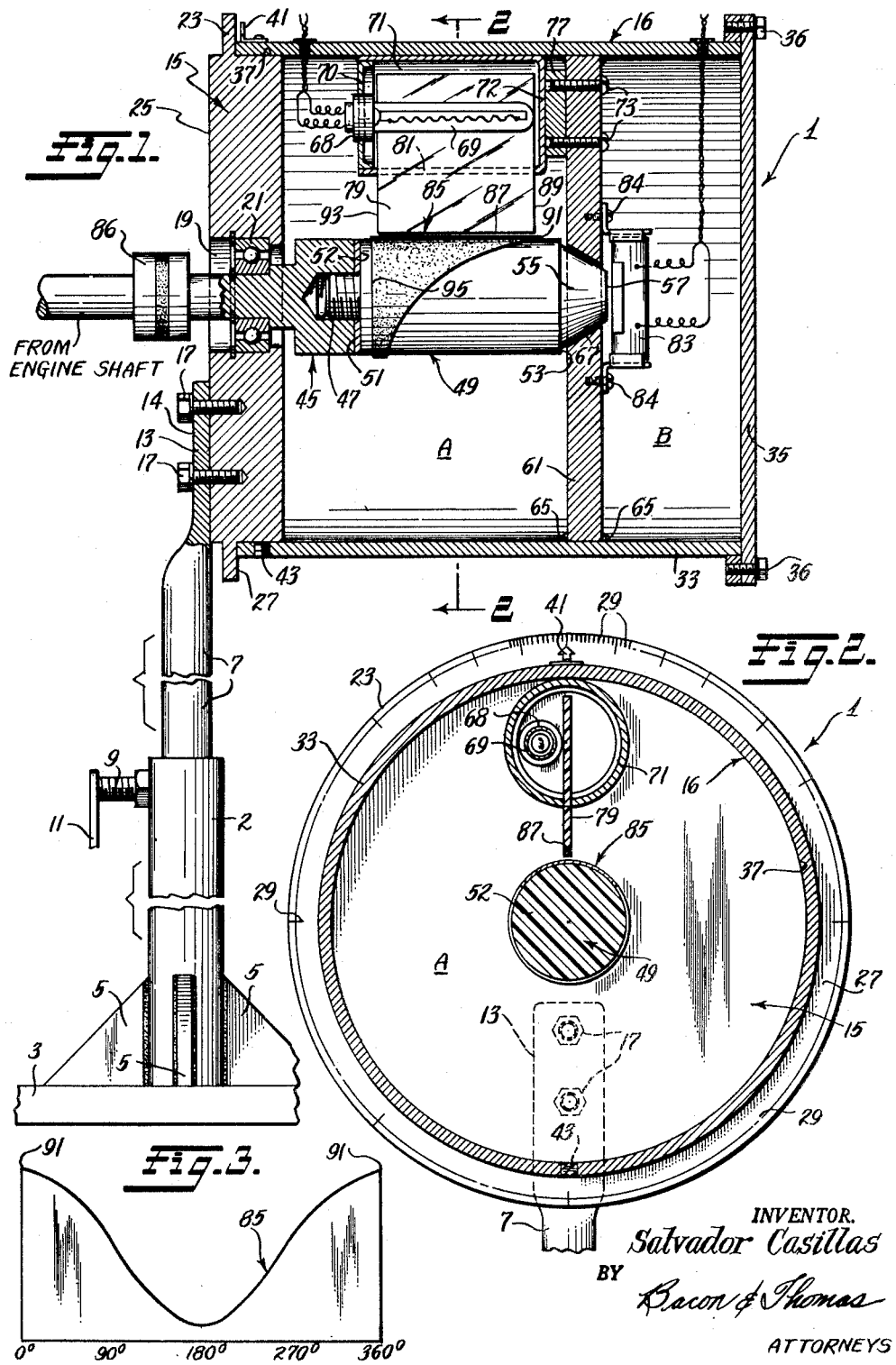

United States Patent Office 3,164,011
Patented Jan. 5, 1965

3,164,011
PHOTOELECTRIC TRANSDUCER UNIT
Salvador Casillas, El Paso, Tex., assignor to El Paso Natural Gas Company, El Paso, Tex., a corporation of Delaware
Filed May 18, 1962, Ser. No. 195,853
11 Claims. (Cl. 73—116)

This invention relates to a novel photoelectric transducer unit for providing an electrical signal representative of a given mechanical function. The device is particularly adapted to be employed in a system for indicating the work delivered or absorbed by a piston of a reciprocating engine or compressor, as revealed in copending application Serial No. 71,016 filed November 22, 1960 now Patent No. 3,052,614, but may also be employed as a signal generator in other systems, as will be apparent to those skilled in the art. The device is adapted to be utilized as a light valve wherever it is desirable to conduct and emit in a predetermined manner, varying amounts of light from a source of light of constant intensity.

The novel transducer, when used in an engine indicator system, may be employed to indicate the position of a piston in a cylinder at each increment of shaft rotation. It controls the transmission of light from a light source to a photocell in a predetermined manner so that the light admitted to the cell is proportional to cylinder volume and the rate of change is a function of crank rotation, thereby generating a voltage proportional to cylinder volume or piston displacement. This signal voltage may be amplified, differentiated, and connected to a computer, oscilloscope, or any device required to perform a given task in accordance with such signal. A particularly desirable feature of the present device is its adaptability to the generation of signals in accordance with complex as well as simple functions. Thus, its use in engine indicators is not limited to ordinary "in line" type engines or compressors, but can be used in indicating complex functions such as would be encountered in an "articulated rod" engine, e.g., as in a radial or vane type engine.

In the past, various devices have been employed to rotate with the crank shaft of an engine to indicate the position of the piston in the cylinder. Such devices, however, in general, have lacked the degree of accuracy desired, a factor which has become increasingly significant with the improved electronic indicating and calculating systems now available for utilizing the signals generated by the transducers.

An object of the invention, therefore, is to provide a transducer unit of the type described, which may be utilized for the generation of a signal representative of substantially any pattern of variation in the course of a cycle.

Another object of the present invention is to provide a transducer of the type described which is simple in design and highly accurate in use.

Another object of the invention is to provide a novel means for accurately varying the amount of light from a light source in accordance with a predetermined pattern and transmitting such variable amount of light to a detector element.

Another object is to provide a photoelectric transducer unit for use in an engine indicator system which is quickly and easily adapted for employment with engines having different connecting rod length and crankshaft throw.

Another object is to provide a light varying and transmitting element which can be used as an extension of a rotating element, such as an engine crankshaft, to thereby eliminate inaccuracies due to auxiliary mechanical linkages.

Another object is to provide a photoeletric transducer unit of the type described which may be employed in connection with an engine having any number of cylinders, either in alignment or otherwise arranged.

Another object is to provide an improved device of the type described for accurately and instantaneously indicating a function of a rotation of a shaft.

Another object is to provide a novel piston displacement function generator which is quickly and easily adjusted to obtain the performance of any cylinder in a multi-cylinder engine or compressor of any type.

These and other objects and advantages of the invention will become apparent from the following specfications, when taken in conjunction with the drawings in which:

FIG. 1 is a side view, partially in section, of the novel photoelectric transducer unit showing the unit connected to an engine crank shaft;

FIG. 2 is a sectional view taken on line 2—2 of FIG. 1; and

FIG. 3 is a plan view of the masking element attached to the periphery of the rotatable light conducting member utilized in the device illustrated in FIGS. 1 and 2.

The photoelectric transducer, as shown in the drawings, comprises a compact portable unit 1. For engine indicator use, the transducer unit 1 is mounted on a vertically disposed tube 2, rigidly supported on a base 3 by radially extending V-shaped ribs 5 welded to the tube 2 and base 3 at the junction thereof. A rod 7 is telescopically received in tube 2, and may be secured in adjusted position by means of a set screw 9 extending through a threaded opening in the side wall of tube 2 adjacent the upper end thereof. The outer end of set screw 9 may be provided with an operating handle 11, for releasing and engaging the inner end of set screw 9 and rod 7. The upper end 13 of rod 7 is provided with a flattened surface 14 on which is mounted a relatively thick disk 15, forming one end wall of a lightproof housing 16 of transducer unit 1. The disk 15, formed of suitable opaque material, is vertically disposed and attached to surface 14 by means of bolts 17.

The center of the disk 15 is provided with an opening 19 in which is fitted an antifriction bearing 21. A peripheral flange 23 is formed on disk 15, adjacent the back face 25 thereof, for a purpose hereinafter described. The front face 27 of flange 23 is provided with radially extending calibrations 29 (FIG. 2), to indicate the 360° of a circle, i.e., to provide a bearing-ring for proper orientation of structure carried by said disk 15.

An opaque cylindrical body 33, provided with an opaque end wall 35, removably secured thereto by screws 36, completes housing 16. The other end of the cylindrical body 35 abuts flange 23 and is adjustably mounted for rotation on the periphery 37 of disk 15. In order to indicate in degrees the relative angular position of housing 33 with respect to disk 15, a pointer 41 is attached to the outer surface of body 33 adjacent to flange 23 which carries calibrations 29. The body 33 of light housing 16 may be secured in adjusted position with respect to disk 15 by means of set screw 43 mounted in a threaded opening in the wall of body 33 and adapted to engage the outer perihpery 37 of disk 15.

A mandril 45 extends through opening 19 in disk 15 and is mounted for rotation about the axis thereof in antifriction bearing 21. The inner end of mandril 45 is provided with a threaded opening 47 into which is screwed the inner end of a threaded, cylindrical rod 49 which comprises a light-conducting element of a type capable of conducting light along its length with relatively little attenuation. Certain plastics, such as polymerized methyl methacrylate marketed under the name "Lucite," have been found quite suitable for the light-conducting element. For convenience, this element will hereinafter be considered to be "Lucite." A gasket 51 may be positioned between the base 52 of rod 49 and the inner end of mandril 45 in order to prevent damage to the base 52 of the Lucite rod 49. Adjacent the other end, the Lucite rod 49 is reduced in diameter to provide a shoulder 53. A frusto-conical portion 55 is formed on the end of rod 49 and extends from shoulder 53 to the outer end 57 of the Lucite member. This provides a means for properly aligning the light-conducting element with respect to the housing structure. The outer end 57, from which light rays are emitted, may be transparent, transluscent, conically bored, or treated in any known manner to enhance the emission of the desired light rays. However, the device requires very little light transmission for operation, and a plane surfaced end, as illustrated, is satisfactory for most purposes. The critical feature is proper control of the variations in light transmitted to provide the desired pattern. The element as shown lends itself well to this purpose.

The interior of body 33 is divided into compartments A and B by a rigid, opaque, light barrier 61 fixedly secured to the inner wall 63 of body 33 as by means of welds 65. A tapered opening 67, conforming in configuration to the outer surface of the frusto-conical portion 55 of rod 49, is formed in the center of barrier 61. Barrier 61 is disposed parallel to end wall 35 and is so positioned within body 33 that the frusto-conical portion 55 of rod 49 is snugly received within the tapered opening 67 when housing 33 is butted against flange 23. When the device is properly assembled, the rod 49 rotates within the housing with substantially no vibration.

A lamp 69 of constant intensity and socket 68 therefor are supported within housing 16 on one end 70 of a closed light proof chamber 71. The lamp 69 may be supplied with electrical energy from any convenient source, e.g., the lead wires may extend through the wall of cylindrical body 33 to be connected to an external source of electricity. Preferably, end 70 of light chamber 71 is easily removed in order to gain access to the interior of the chamber. The outer end 72 of the chamber 71 is rigid with the side walls thereof and is secured to barrier 61 by means of screw-threaded fasteners 73 passing through openings formed in barrier 61, and engaging threaded openings in a mounting block 77 rigidly secured to the end 72 of chamber 71. A strip of light-conducting Lucite 79 is disposed between lamp 69 and the outer surface of Lucite rod 49. The Lucite strip 79 fits tightly in an elongated slot 81 formed in the bottom of chamber 71, and may be held in position by the friction grip exerted by the walls of slot 81 theron or by any other suitable means. The end of Lucite strip 79, which terminates adjacent Lucite rod 49, is disposed parallel to the axis of the rod and is slightly spaced from the outer surface thereof. As shown, strip 79 extends substantially radially from adjacent the outer surface of Lucite rod 49 through slot 81 and into light chamber 71 to a point wherein the other end of the strip of Lucite 79 is disposed tangent to the lamp 69. When lamp 69 is lit, this end of the strip 79 will glow substantially uniformly along its length, thereby directing a well defined beam of light radially against the periphery of Lucite rod 49 from end to end thereof.

A photocell 83 is attached by screws 84 to the outer side of barrier 61 in chamber B to detect light picked up by Lucite strip 79 from lamp 69, transmitted thereby to Lucite rod 49, picked up thereby and emitted from its outer end 57. The photocell 83 provides an output voltage proportional to the amount of light received. This output voltage is connected by means of suitable electrical conductors extending through body member 33, as shown, to a suitable indicating means disposed outside of housing 16.

An opaque mask 85 (also shown in plan view in FIG. 3), extends completely around the periphery of Lucite rod 49 and is so configured as to interrupt light being transmitted from lamp 69 through Lucite strip 79 to Lucite rod 49 and photocell 83, in an amount proportional to the displacement of a piston in a cylinder. Masks having other patterns designed to perform a desired function may be employed where the device is to be used for other purposes.

While rods and sheets of Lucite and similar materials are considered to be relatively opaque to light rays traveling in directions parallel to their lengths, it has been found that the Lucite members, as shown, will pick up sufficient light from the light source and transmit it along their lengths, by reason of the high internal reflection, to provide a sufficiently strong signal for operation of the photoelectric cell.

Mandril 45 may be attached to the crankshaft of an engine, as shown in FIG. 1, by means of a conventional coupling 86. After synchronizing the unit, in a manner hereinafter described, the engine is started. The mask 85 regulates the amount of light pasing to Lucite rod 49 so that the amount of light transmitted to the photocell 83 is proportional to piston displacement. This varying amount of light is detected by the photoelectric cell which generates a voltage proportional to the amount of light being detected, thereby providing an electrical signal proportional to piston displacement.

In FIG. 3, the opaque mask 85 illustrated conforms to a graph of the actual displacement of a piston in a cylinder through one complete revolution of the crank shaft. Each increment of movement of the piston from the uppermost position in the cylinder to the lowermost position and its return to the uppermost position is calculated and plotted on the graph. The graph has been determined to be substantially the cosine function of the crank angle for 360° of revolution of the crankshaft. The mask 85 is cemented or otherwise attached to the periphery of Lucite rod 49 and cooperates with the adjacent edge 87 of Lucite strip 79 in such a manner that the amount of light passing the mask is regulated from zero amount (the position shown in FIG. 1) to a maximum amount to simulate piston movement between the uppermost and lowermost position, respectively, in the cylinder. The voltage generated by the photoelectric device is thereby exactly proportional to displacement of the piston. The greatest length of mask 85 is slightly longer than the length of the edge 87 of strip 79 disposed adjacent rod 49. By forming mask 85 longer than edge 87, the mask 85 may be made in one piece. One side 89 of the strip 79 terminates opposite the apex 91 of the mask while the other side 93 of strip 79 terminates inwardly of the base 95 of mask 85.

The housing 16 is synchronized with the piston being tested in such a manner that, when the piston is in the uppermost position in the cylinder, the mask 85 prevents any of the light being conducted by strip 79 from reaching Lucite rod 49. This may be accomplished by loosening set screw 43 and rotating housing 16 until the edge 87 of Lucite strip 79 is opposed by the greatest length of the opaque mask 85 and then securing the housing in adjusted position. As the crank shaft rotates mandril 45 and Lucite rod 49, the opaque mask will rotate therewith exposing a portion of the Lucite rod to the light being emitted from the lower edge 87 of the Lucite strip 79 in proportion to the angular displacement of the crank shaft. The intensity of the light emitted from the lower edge 87 of Lucite strip 79 is uniform from one end to the other. The amount of light received by the exposed portion of Lucite rod 49 is conducted to its end 57 where it is received by photocell 83 which provides a signal for the external indicating means (not shown) representative of the displacement of the piston in the cylinder.

When the piston reaches the bottom of the stroke, the maximum amount of light will be conducted from lamp 69 to photocell 83. Thus it will be seen that as the piston moves downwardly in the cylinder from top to bottom, the amount of light conducted through Lucite rod 49 to photocell 83 will increase from zero amount to the maximum amount. During return movement of the piston from bottom to top position, the amount of light conducted by rod 49 decreases from a maximum amount to zero. In this manner the mask on the rotating cylindrical member 49 regulates the amount of light passing from the source of light of constant intensity to the light sensing means in proportion to piston displacement.

As the ratio of crankshaft throw to connecting rod length differs in various engines, it will be necessary to provide a mask having a particular contour for the engine being tested. This can be accomplished by either removing one mask and applying one of the proper contour to the periphery of Lucite member 49 or by providing a different Lucite member 49 with the appropriate mask applied. Ready access to Lucite member 49 and to lamp 69 is obtained by loosening set screw 43 and removing housing 16 from the periphery 37 of disk 15.

In order to calculate the proper contour of opaque mask 85 for engines having a different ratio of crankshaft throw and piston rod length, the following equations may be followed:

$d$ is the displacement from top dead center,
$r$ is the crank throw,
$\theta$ is the crank angle from top dead center position,
$L$ is the connecting rod length, and
$\phi$ is the angle formed by the connecting rod with the cylinder axis.

The value $d$ may be expressed in terms of variable angle $\theta$. $r$ and $L$ remain constant for any one crank system. Therefore, (1)
$$d = -r \cos \theta - L \cos \phi + K + r \text{ (every quadrant)}$$
(2)
$$L \sin \phi = r \sin \theta \text{ (every quadrant)}$$
Eliminate $\phi$:
From (2)
$$\sin \phi = r/L \sin \phi$$
$$\sin^2 \phi = r^2/L^2 \sin^2 \theta$$
Identity
$$\cos \phi = \sqrt{1 - \sin^2 \phi} = \sqrt{1 - r^2/L^2 \sin^2 \phi}$$
From (1)
$$d = -\cos \theta - L\sqrt{1 - r^2/L^2 \sin^2 \theta} + (L + r)$$
$$d = r \cos \theta - \sqrt{L^2 - r^2 \sin^2 \theta} + (L + r)$$
(3)
$$d = L + r - r \cos \theta + \sqrt{L^2 - r^2 \sin^2 \theta}$$

It has been determined that the cosine function for all crank angles nearly coincides with the actual piston displacement. With this ratio of connecting rod length to crankshaft throw, the value for piston displacement is substantially equal to a simple cosine function for all positions of the crank. As the ratio of the connecting rod length to the crankshaft throw increases, the expression for piston displacement from top dead center more nearly approaches the simple cosine function. The function for $d$ in Equation 3 can, therefore, be simulated by the graph of an opaque mask. As disclosed herein, the mask 85 is attached to the periphery of a cylindrical light-conducting member 49, of Lucite or other material of similar optical properties, and cooperates with the lower edge 87 of a radially extending strip 79 of light-conducting material providing a strip of light of uniform intensity disposed contiguous to and parallel to the axis of rotation of the mask.

When it is desired to test another cylinder of the engine, set screw 43 is loosened and housing 33 is rotated through the number of degrees by which the crankshaft throw for the piston to be tested is offset from the one previously tested and is then secured in this position by tightening set screw 43. By means of pointer 41 mounted on housing 16 cooperating with calibrations 29 on fixed disk 15, rotation of housing 33 through any desired number of degrees is quickly and accurately accomplished.

Various modifications in the structure of the present device will occur to those skilled in the art. For example, the mask 85, which is shown attached to the periphery of Lucite rod 49, may be formed differently from the one disclosed herein and still perform the same function. If it is not desirable to employ a mask, the outer surface of Lucite rod 49 may be coated with an opaque paint or otherwise treated or formed to interrupt a portion of the light being emitted from the lower edge 87 of Lucite strip 79. It is also obvious that other means may be employed for directing a narrow, elongated beam of light of uniform intensity along its length against the surface of the cylindrical light-transmitting element.

The present device may be employed in the manner described for indicating the degree of angular rotation of a shaft or other element by applying the appropriate mask to Lucite rod 49. Any function of rotation of an element may be sensed and indicated by providing a mask of the proper type on Lucite rod 49.

As previously mentioned, the device disclosed herein may be employed as a light valve. The amount of light conducted by Lucite rod 49 and emitted at the end 57 thereof can be varied between zero amount and a maximum amount by merely rotating the rod. Any light sensing means, as may be conventionally employed with light valves and the like, may be utilized when the device is so employed.

All such modifications, alterations or equivalent structures as may occur to those skilled in the art are to be considered with the purvey of the present invention, as fall within the scope of the appended claims.

I claim:

1. A device for providing a variable quantity of light in accordance with a predetermined engine function, comprising:
    (a) a light-conducting member of cylindrical configuration supported for rotation about its cylindrical axis, said member having the property of conducting light along its length and emitting said light at an end thereof;
    (b) means for directing a beam of light of constant intensity along a restricted path against the periphery of said member and parallel to said cylindrical axis;
    (c) means on the periphery of said light-conducting member for masking at least a portion of said light beam in accordance with said engine function upon rotation of said member;
    (d) means disposed at the light-emitting end of said member for sensing the quantity of light conducted by said member;
    (e) and means for rotating said light conducting member in synchronism with rotation of the shaft of said engine.

2. The device of claim 1 wherein the means for directing an elongated beam of light of constant intensity along a restricted path against the peripheral surface of said cylindrical light-conducting member includes a housing having a lamp therein and having a slot for the passage of light, said housing being mounted for angular adjustment about the axis of said cylindrical member, and the device including means for indicating the degree of angular adjustment of said housing about said axis.

3. The device of claim 1 wherein the cylindrical light-conducting member is mounted for rotation within a lightproof housing, said housing having a dividing wall between the means for directing a beam of light against the periphery of said cylindrical light-conducting member and the means for sensing the quantity of light conducted by said cylindrical light-conducting member, the said light-emitting end of said cylindrical light-conducting member being disposed for rotation in an opening in said dividing wall.

4. A piston-displacement function generator, comprising:
   (a) a housing having an end wall provided with a circular peripheral surface and a cylindrical wall mounted on said end wall, said cylindrical wall being received on said circular peripheral surface and extending outwardly therefrom;
   (b) a mandril extending through an opening in said end wall and being adapted for rotation therein, the outer end of said mandril being adapted to be connected to the drive shaft of an engine being tested;
   (c) a cylindrical light-conducting member mounted on the inner end of said mandril within said housing, said light-conducting member having the property of conducting light along its length and emitting light at an end thereof;
   (d) means mounted upon the cylindrical wall of the housing for directing a beam of light of substantially constant intensity along a restricted path on the periphery of said cylindrical light-conducting member parallel to its axis of rotation;
   (e) masking means on the periphery of the light-conducting member for masking a portion of said light beam during rotation of said member in a pattern proportional to piston displacement of an engine being tested; and
   (f) photoelectric means disposed at the light-emitting end of said light-conducting member for sensing the quantity of light conducted by said member during rotation thereof and providing an electrical signal proportional thereto.

5. The device of claim 4 wherein said light-conducting member is a cylinder of polymerized methyl methacrylate.

6. The device of claim 4 wherein said light-conducting member is a cylinder of polymerized methyl methacrylate and the means for directing a beam of light along the periphery of said light-conducting member includes a sheet of polymerized methyl methacrylate having a light-emitting edge adjacent said periphery and a light-receiving portion disposed adjacent a light source.

7. The device of claim 6 wherein the light source is a lamp disposed in a lightproof chamber mounted on the cylindrical wall of the housing, said lightproof chamber having a slot through which said sheet of polymerized methyl methacrylate extends.

8. The device of claim 4 wherein said end wall of the housing is mounted upon a vertically adjustable standard.

9. The device of claim 4 wherein said cylindrical housing wall is mounted for rotatable adjustment with respect to said end wall to thereby facilitate orientation of the device with respect to the position of a piston of an engine being tested.

10. The device of claim 4 wherein the masking means comprises an opaque sheet having an edge graphically determined, said masking sheet having then been affixed to said light-conducting means.

11. A device for conducting light from a source of light of constant intensity and emitting light in varying controlled amounts comprising:
   (a) a cylindrical light-conducting member supported for axial rotation;
   (b) means for directing an elongated beam of light of constant intensity along a portion of the peripheral surface of said member parallel to the axis of rotation, said means comprising a closed light-proof chamber, a source of light of substantially constant intensity disposed within said chamber, a strip of plastic material capable of transmitting light along its length, extending between said light chamber and said peripheral surface of said member, one end of said strip extending radially of said cylindrical light-conducting member and being disposed contiguous to the said peripheral surface, and the other end of said strip extending through a slit of substantially the same size as said strip formed in the wall of said chamber and terminating in said light chamber adjacent to said source of light of constant intensity;
   (c) said light-conducting member having the property of conducting light along its length and having a high degree of internal reflection;
   (d) an end of said light-conducting member having a surface for emitting the rays of light conducted by said member along its length; and
   (e) means on said peripheral surface of said cylindrical light-conducting member for masking at least a portion of said beam of light upon rotation of said member, whereby the amount of light transmitted by said member is controlled in a predetermined manner.

References Cited in the file of this patent

UNITED STATES PATENTS

| | | |
|---|---|---|
| 1,985,044 | Lyle | Dec. 18, 1934 |
| 2,486,029 | Holst | Oct. 25, 1949 |
| 2,964,993 | Witt | Dec. 20, 1960 |

OTHER REFERENCES

Automotive Industries, "Three New Photoelectric Instruments," by K. J. De Juhasz, July 1, 1947, pp. 36–39 and 60.